Dec. 12, 1967  D. M. GOODMAN ET AL  3,357,288
AUTOMATIC POSITIONING DIE ATTACHMENT FOR DIE PRESS
Filed Nov. 16, 1965  5 Sheets-Sheet 1

INVENTORS
DANIEL GOODMAN
ROBERT W. BRAKEMAN, Jr
DANIEL B. VENTRE

ATTORNEYS

Dec. 12, 1967  D. M. GOODMAN ETAL  3,357,288
AUTOMATIC POSITIONING DIE ATTACHMENT FOR DIE PRESS
Filed Nov. 16, 1965  5 Sheets-Sheet 3

INVENTORS
DANIEL GOODMAN
ROBERT W. BRAKEMAN, Jr.
DANIEL B. VENTRE

ATTORNEYS

INVENTORS
DANIEL GOODMAN
ROBERT W. BRAKEMAN, Jr.
BY DANIEL B. VENTRE

ATTORNEYS

FIG. 15

INVENTORS
DANIEL GOODMAN
ROBERT W. BRAKEMAN, Jr.
DANIEL B. VENTRE

ATTORNEYS

United States Patent Office 3,357,288
Patented Dec. 12, 1967

3,357,288
AUTOMATIC POSITIONING DIE ATTACHMENT
FOR DIE PRESS
Daniel M. Goodman, Massapequa Park, N.Y., and Robert Brakeman, Jr., Darien, and Daniel B. Ventre, Stamford, Conn., assignors to Positioning Devices, Inc., New York, N.Y., a corporation of New York
Filed Nov. 16, 1965, Ser. No. 508,053
23 Claims. (Cl. 83—62)

This invention relates to an automatic die positioning attachment for a die press.

More specifically, our invention pertains to an automatic die positioning device which is adapted to be attached to any conventional type of die press, such, for example, as a clicker press or a dinking press. Presses of this type are characterized by a broad stationary horizontal cutting block above which a ram is mounted for vertical reciprocation. The ram may be driven by a rotating crank shaft, a cam or a crank pin or it may be hydraulically actuated, the only functional requirement being that the ram be moved vertically toward and away from the fixed cutting block.

It has been the customary practice for many years, to use such die presses for the mass production of items made from sheet material like, for instance, cloth, knit goods, plush, leather, canvas, paper, paperboard, foamed elastomer sheets, metal foil and plastic sheets. The sheet material was spread, i.e. laid out, on the cutting block in a stack of from a few to a great number of sheets. Thereafter a single rule die or gang of rule dies, with each rule die defining a hollow area, was superimposed on the top of the stack in the clearance provided over the stack when the ram was at the high point of its travel. Then the ram was lowered and the die would cut through multiple sheets in the stack. The die was positioned on the stack by hand. After each cutting operation the die was withdrawn from the stack, the stack of cut items within the die was stripped therefrom, and the die was placed in a new position on the stack, again, manually.

In some die presses, particularly hydraulic die presses, the portion of the ram known as the platen or beaver tail, which contacted the hollow die was swung to an out of the way location when the ram was in its uppermost position, whereby to facilitate manual placement of the hollow die in a new position. The platen then had to be swung back to overlie the die before the press was actuated to lower the ram and push the die through the stacked sheets.

It will be appreciated that the foregoing equipment and process had many drawbacks. For example, despite the many safeguards which are associated with die presses, such for instance as guards and spaced switches, both of which must be actuated to start a die cycle, operators sometimes through accident, and sometimes almost as a result of deliberate carelessness, suffered severe injury to their hands and even dismemberment.

Too, the speed of operation and hence the labor cost was high. A skilled operator was required. And even with good skills, an operator could not run the press through more than about two cycles a minute. An excellent time for the performance of one full cutting and die positioning cycle was about 25 seconds. One time consuming operation was the proper placement of the die in its new position and getting the operator's hands out from under the ram before the fresh cycle was started.

Another desideratum was economy of material, or phrased differently, minimization of scrap in the sheets from which the die cut articles were being severed. In order to prevent distortion of the shapes of the pieces being cut from the stack it was necessary to have at least a minimum width of scrap, this being the closest distance between any two adjacent pieces being cut from a sheet.

On the other hand, if the scrap exceeded this distance it represented unwanted waste. It was not possible, for instance, to salvage any appreciable value from textile or paperboard stock and even in the case of plastic or metal foils, the salvage value was quite low in comparison to the value of the material in the sheet form. An operator who was working under the pressure of time to obtain maximum production, could not quickly and accurately judge the position of the die as he replaced it after each cycle. Therefore, the tendency has been to increase the scrap and thereby raise production costs.

It is an object of our invention to provide a system and process which will avoid the foregoing drawbacks. More particularly, it is an object of our invention to provide a system and process of the character described which avoids the foregoing drawbacks while still using existing die presses. There are a tremendous number of die presses now used in many industries for the purpose of cutting multisheeted stacks of material. Purusant to the last mentioned object of our invention, we provide an attachment which enables these existing machines to be used in such a manner as to overcome the described deficiencies.

Specifically, it is an object of our invention to provide a system and process of the character described which make use of an attachment capable of being mounted upon and used with existing die presses of the type that heretofore have had the rule dies positioned manually.

It is another object of our invention to provide an attachment of the character described for automating the die placement of the hollow die of a die press.

It is another object of our invention to provide an attachment of the character described which will automatically step a hollow die transversely across a stack from a home position at one side of the stack and, optionally, will step the die longitudinally of the stack after each transverse pass, or will return the die to the home position and permit the operator to shift the stack or step the die longitudinally either by hand or by mechanical means.

It is another object of our invention to provide an attachment of the character described which, without human assistance, will move a die step by step transversely across a stack a predetermined amount from cutting cycle to cutting cycle so that the possibility of harm to the operator is greatly minimized, so that the time consumed for each cycle is greatly reduced and so that the scrap created can be substantially minimized.

It is another object of our invention to provide an attachment of the character described which can be easily fitted onto existing die presses where it will work rapidly and surely with maximum effectiveness.

It is another object of our invention to provide an attachment of the character described which is smooth, positive, and efficient in operation, and which constitutes relatively few and simple parts so that it is rugged and reliable, so that it will require very little maintenance and so that the little maintenance necessary can be performed quickly and economically.

It is another object of our invention to provide an attachment of the character described in which the adjustment of the predetermined transverse step (increment) taken by the die can be very easily and quickly set, whereby the attachment can be regulated in the field by persons of little mechanical and electrical skill.

It is another object of our invention to provide an attachment of the character described in which the electrical circuit and controls are greatly simplified both to increase their reliability and to enable repairs thereto to be made from simple manuals without factory technicians and without an elaborate training course.

It is another object of our invention to provide an attachment of the character described which functions without a direct positive mechanical driving connection between the ram and the die so that, in effect, the die is free of (mechanically unconnected to) the ram or is only lightly pressed by the ram when the ram is in the uppermost part of the retraction stroke. In the foregoing connection, it is a subsidiary object of our invention to provide an attachment of the character described in which the die and the die shifting means are independent of the ram but are caused to follow the ram vertically, as under the influence of a biasing means, each time that the ram lifts, and are pressed down by the ram each time that the ram is lowered. Thereby the mounting of the attachment does not involve a mechanical connection between the ram on the one hand, and the die or the die locating means on the other hand, thus greatly simplifying the construction and installation of the attachment.

Other objects of our invention in part will be obvious and in part will be pointed out hereinafter.

Our invention accordingly consists in the features of construction, combinations of elements, arrangements of parts and series of steps which will now be exemplified in the attachment and process hereinafter described, and of which the scope of application will be indicated in the appended claims.

In the accompanying drawings in which is shown one of the various possible embodiments of our invention.

In general, we provide an attachment which is adapted to be mounted on a stationary portion, e.g. the cutting block, of a die press, in such a position that the hollow frame of the attachment circumscribes a cutting area on the cutting die block so as to leave the same clear for reception of a stack of laid-out sheets below the die locating carriage.

The attachment includes, in addition to the hollow mounting frame, a die locating carriage to the under face of which is secured any desired configuration of hollow die such as conventionally is employed in die presses. This may constitute a single die or a gang of dies. Furthermore, the attachment is provided with a powered mechanism for moving the die locating carriage horizontally and particularly for moving the die carriage horizontally in a transverse direction, to wit: a horizontal direction transversely of the die press and transversely (across the width) of the stack of sheets laid out in the die press. The attachment may further include powered means for horizontally shifting the location of the die holding carriage in a direction longitudinally of the stack of sheets, this being in a horizontal direction perpendicular to the first named horizontal transverse direction.

The powered means for shifting the die locating carriage transversely and horizontally further includes a settable indexing means such that for each operational cycle of the die press the die holding carriage will be shifted transversely and horizontally a fixed predetermined amount (increment) which in practical operation will suffice to clear the previously cut column of pieces in the stack by a minimum acceptable amount of scrap.

It will be observed that the hollow mounting frame for the attachment serves as a support for the horizontally movable die locating carriage. Hence, through said frame, the die locating carriage is functionally attached to a stationary component of the die press. Pursuant to our invention, simple means is provided to operationally interengage the die locating carriage and the vertically reciprocable platen of the die press during the effective downward and upward portion of the stroke of the ram, despite the fact that the die locating carriage is mounted on a stationary component of the press rather than on the movable ram. Said means constitutes a vertically shiftable suspension arrangement for the die locating carriage together with a means for biasing the suspension arrangement upwardly. In this manner, when the die press is idle and the ram is lifted, the biasing means urges the die locating carriage to an uppermost position in which the die locating carriage, or an element functionally unitary therewith, either presses against the horizontal flat under surface of the ram platen or is spaced therefrom. Then as the platen descends during a cycle of operation, it will press the die locating carriage downwardly, together with the die, into cutting relationship with the stack of sheets. Thereafter, when the platen lifts, the biasing means will urge the die locating carriage upwardly so that the carriage and die will follow the platen in its upward stroke, thereby to free the die from its cutting engagement with the stack of sheets and allow the die locating carriage to be stepped to its next succeeding position.

The attachment also includes means for restoring the die locating carriage to a home position, for instance the left hand side of the machine viewed from the front. Said restoring means may be automatically operable at the end of a transverse pass when a further step would shift the die beyond a predetermined position at the opposite side of the stack, e.g. with the die entering the selvage of the sheets, or even extending beyond the selvage, or said restoring means may have its operation initiated under the operator's control. The machine may additionally include other sophisticated equipment for performing additional functions. These will be referred to in the subsequent description.

Referring now in detail to the drawings, the reference numeral 20 denotes a die press, and the reference numeral 22 an attachment constructed in accordance with our invention for automatically relocating a hollow die in the press after each of a series of cutting cycles of the press ram. The specific attachment automatically relocates the die step by step transversely in increments across the width of the press from a homing point at the left hand side of the press.

The press is characterized by a lower horizontal stationary cutting block and an upper vertically reciprocatable ram having a horizontal pressing surface (platen)

parallel to and directly over the horizontal surface of the cutting block. Any suitable means is employed to vertically reciprocate the ram. The illustrated press is of the hydraulic variety and hence employs suitable hydraulic mechanism for actuating the press ram. Since presses of this nature are entirely standard, no detailed description thereof will be given. By way of example, it will be mentioned that the press shown is manufactured by Ormont Machine Co., Inc., of New York City.

Essentially, the press 20 constitutes a base 24 on opposite sides of which are erect pedestals 26 that at their upper ends support a bridge 28. A horizontal cutting block 30 is located on the upper face of the base 24. The bridge 28 contains a hydraulic cylinder (not shown) in which the upper end of a vertically movable hydraulic piston 32 is located. The lower end of the piston is formed into the shape of a ram platen 34 which is an element having a broad downwardly facing hroizontal surface. Said platen customarily is made of steel or iron so as to enable it to withstand the high pressures heretofore encountered when it engaged a hollow die during a press cutting operation. A wheel 36 usually is included to adjust the position of the ram at the bottom of its pressure cutting stroke. However, the ram is electrically operated, the controls for the same being contained within a switch box 38 secured to to one of the pedestals 26.

Figure 1:
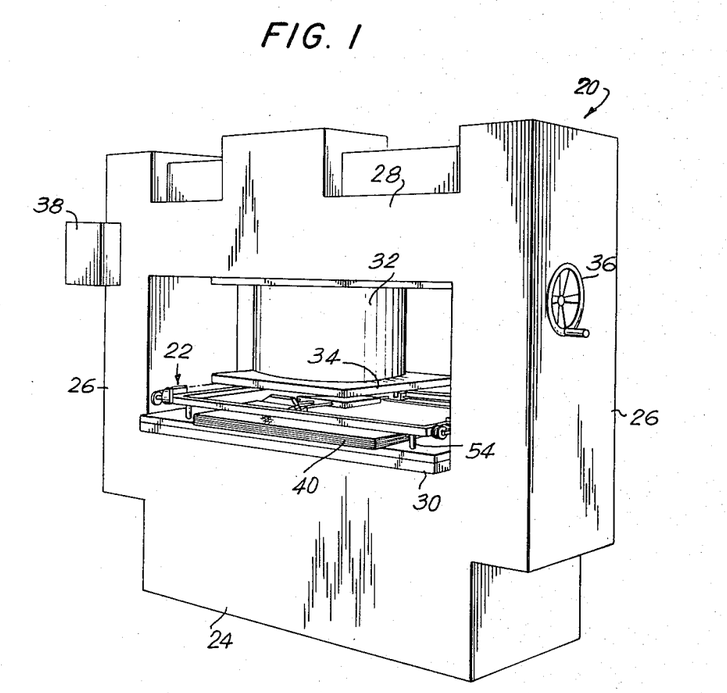
FIG. 1 is a three-quartered perspective view of a hydraulic die press with the piston at the top of its retraction stroke and with an attachment embodying our invention situated on the cutting block of the press.

The electrical controls for the ram are quite conventional. When the control circuit is actuated it will, through valving and operation of a pump cause the ram to descend to a predetermined level and then reverse the ram to raise it back to an upper position of rest. In other words, the ram single stroke cycle, when initiated, starts the ram from the upper position shown in FIGS. 1 and 2, will cause it to descend to a predetermined lower position and then will restore it to its upper position whereupon the ram comes to a halt.

In the use of a press, such as the one illustrated, for die cutting operations a stack 40 of sheets is placed on the cutting block 30. This stack of sheets may be composed of any material that can be readily cut by a hollow die. Typical materials are cloth, knitted fabrics, felt, metal foil, plastic sheets, paper and paperboard and foamed plastic sheets. Usually, when cloth or other textile fabrics or long sheets are being cut, they are furnished in elongated pieces, the widths of which are less than the width of the cutting block, and the lengths of which are much greater than the front-to-back dimension of the cutting block. These pieces customarily are laid out in a stack on a table extending rearwardly from the rear edge of the cutting block with the front edges of the pieces in substantial registration with one another. Then the forward parts of all the pieces are conjointly drawn forward onto the cutting block so as to rest upon the same with the front edges of the pieces near the front edge of the cutting block. This is the position shown in FIG. 1. Alternatively the stack have a plan size equal to or less than the cutting area of the block and is positioned within said area. The height of the stack of the sheet material to be cut is such that, when added to the height of the hollow cutting die to be used, it is less than the space (throat) between the cutting block and the platen in its uppermost rest position. This permits an operator to move about the cutting die in a cutting system as it was practiced prior to the advent of our instant invention.

It also will be observed that the height of the stacked material preferably does not exceed the height of the cutting die so that the ram will be able to press the die through all the sheets in the stack until the die encounters the cutting block. It is preferred to have the height of the stack somewhat less than the height of the cutting die so that the die will not be submerged in the stack if the stack is compressed during a cutting operation inasmuch as this makes withdrawal of the die too difficult.

In the use of our attachment, the combined height of the cutting die and the stack is less than the distance (throat) between the cutting block and the ram in its most elevated position by an additional amount which is at least equal to the height of the die locating carriage which will hereinafter be described in detail.

As previously indicated, pursuant to our invention, we supply the attachment 22 for the purpose of moving the hollow cutting die horizontally across the upper surface of the uppermost sheet in the stack, this incremental movement being performed automatically in response to the termination of a cutting cycle of the ram. That is to say, after each cutting cycle of the ram is completed, the attachment will step the cutting die one increment to its next cutting position where it will clear the previous cutting position by an amount of scrap selected by the operator.

As noted previously, the attachment 22 is particularly simple to mount on a machine and to service because the attachment is secured only to a stationary component of the machine and it does not have a direct physical mechanical connection to the moving ram or platen. The attachment cycles itself, that it to say, senses the up and down movement of the platen and is brought into play to step the die when the ram reaches its uppermost rest position. The attachment also recycles the ram after each incremental step of the die is completed. Thereby after the attachment is initially activated vertical movement of the ram and transverse stepping of the die occur alternately.

The purpose of the attachment is to carry a hollow die 42. These dies are entirely standard. That is to say, their general construction is conventional, although it will be appreciated that the shapes of the dies will vary in accordance with the shapes of the pieces to be cut from the stacked sheets.

Figure 11:
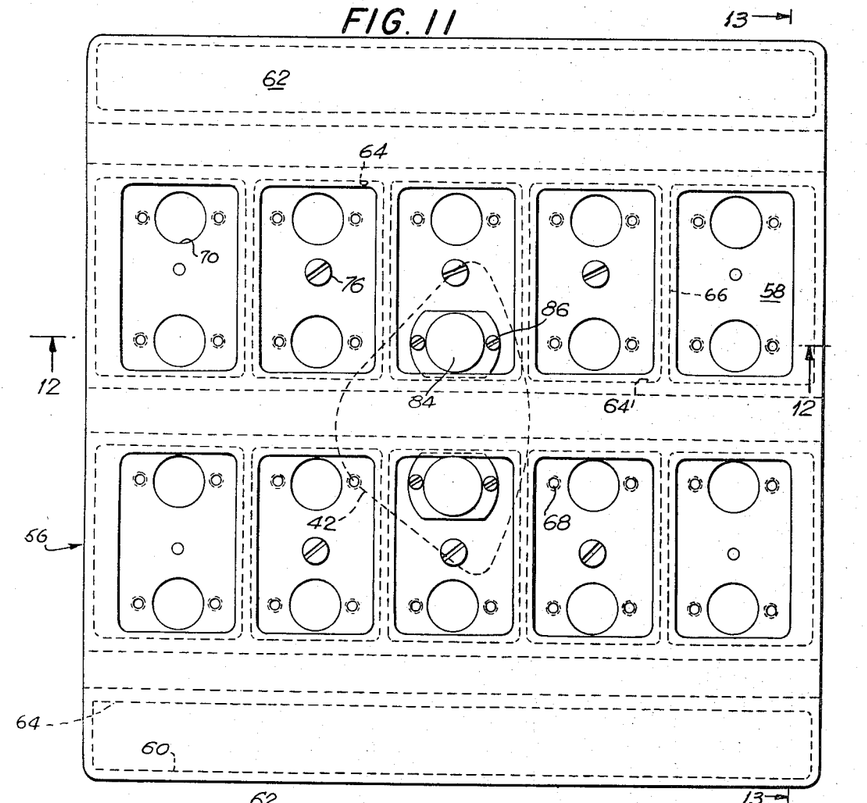
FIG. 11 is a top plan view of the die locating carriage.
Figure 12:
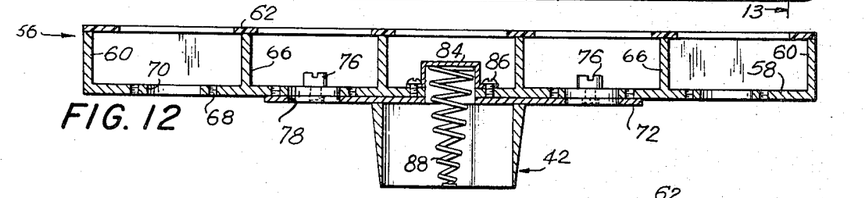
FIGS. 12 and 13 are sectional views taken substantially along the lines 12—12 and 13—13, respectively of FIG. 11.

In FIGS. 11 and 12, one such die has been illustrated. The profile plan contour of the die is shown in FIG. 11 where it will be seen to constitute a triangle with a rounded apex and with an outwardly convex base opposite to the apex. The remaining two angles are filleted. The die is hollow from top to bottom and is provided with a lower sharp edge. The die section tapers in thickness from a blunt wide upper platen engaging edge, to a sharp lower cutting edge. The angle of taper will vary in accordance with the material being cut as will the thickness of the die and the material of which it is made.

The die bounds a closed area so that when the die is pressed through a sheet of material it will cut out a complete piece which is wholly severed from the remainder of the sheet. The upper and lower surfaces of the die are parallel to one another.

Figures 5, 6, 7, 9, 10:
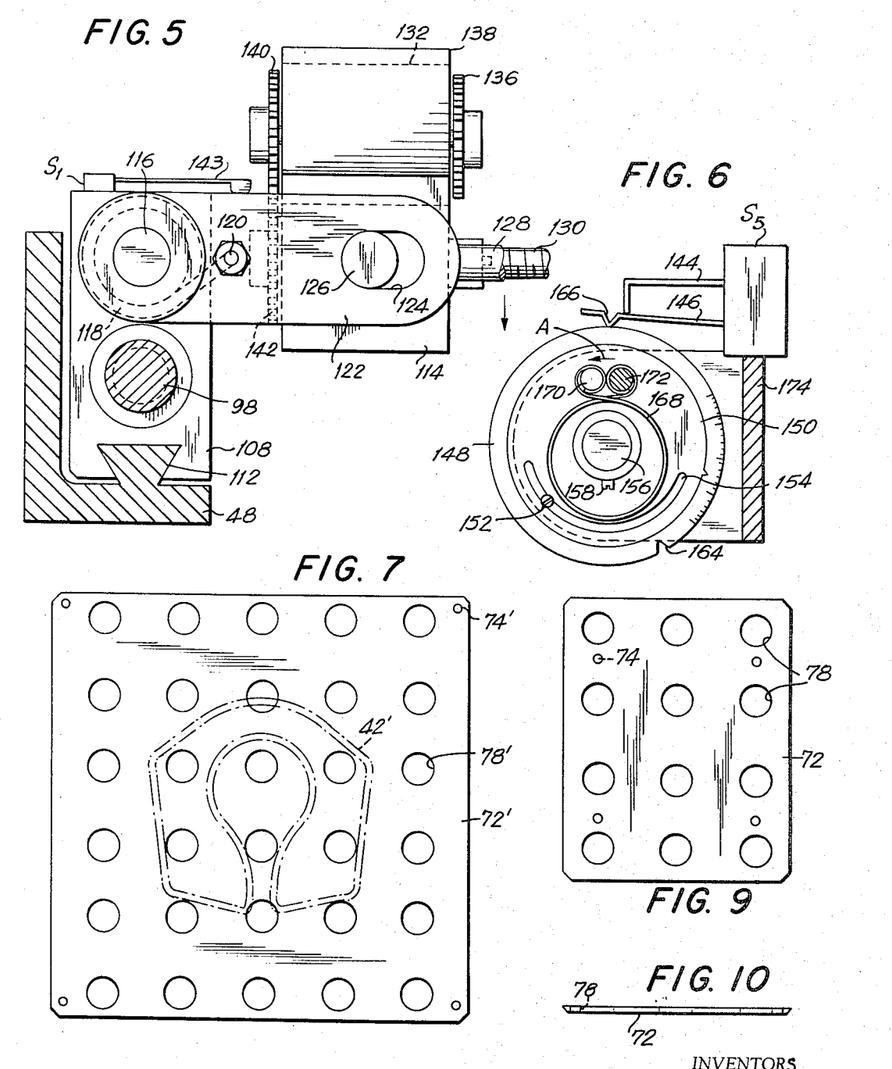
FIG. 5 is an enlarged fragmentary sectional view taken substantially along the lines 5—5 of FIG. 3.
FIG. 6 is an enlarged sectional view taken substantially along the line 6—6 of FIG. 3 and illustrating the increment switch.
FIG. 7 is a bottom plan view of a large die holding plate.
FIG. 9 is a bottom plan view of a small die holding plate.
FIG. 10 is a side elevational view of the plate shown in FIG. 9.
Figure 8:
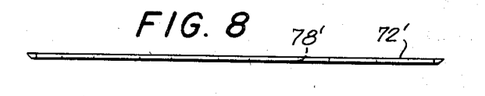
FIG. 8 is a side elevational view of said plate.

In FIG. 7 we have illustrated in dot and dash line another configuration of die 42' which is in the shape of a trapezoid with an upper arcuate side and a lower side that is broken into two spaced converging sections separated by a bulb-shaped boundry.

Inasmuch as the pieces cut with such dies serve a tremendous variety of purposes, e.g., garment panels, shoe panels, hat panels, handbag panels, brassiere panels, etc., there is an almost endless variety of shapes of dies which are used.

The attachment 22 includes a rectangular frame 44 which mounts the various attachment components. Said frame defines a large opening 46 of sufficient size to circumscribe the entire cutting area of the cutting block 30 and therefore big enough to freely pass the platen 34. Said opening is wide enough when the frame is properly positioned to fully expose the full width of the stack 40 of sheets resting on the cutting block.

The frame is composed of sturdy elements that will maintain the frame in its fabricated shape and resist forces tending to skew or otherwise distort the frame during the operation of the attachment. In particular, the frame consists of front and back members 48 each of which, for the purpose of stiffness, is of angle bar shape (see FIG. 5), including a vertical outer flange and a horizontal lower flange. The side members 50 of the frame may likewise be of angular cross-section or, as illustrated, simply constitute strips of vertically elongated cross-section. For purposes of strength and rigidity the frame members preferably are formed from steel. The frame members are rigidly interconnected as by bolts, rivets or welding.

The frame is adapted to be rigidly affixed to a stationary part of the die press, as, for example, the cutting block 30, the base 24 or the pedestals 26. As shown, the frame is mounted on the cutting block. To this end, the horizontal flanges of the front and back angle members are formed with openings therein, for instance, one opening adjacent each corner of the rectangular frame, through which openings the shanks of bolts 52 are passed. The threaded tips of the bolts are tightly engaged in tapped bores in the cutting block 30. The frame is held in a fixed horizontal position at a level above the horizontal level of the upper face of the cutting block, as by spacing sleeves 54 through which the shanks of the bolts 52 pass and the upper ends of which are abutted by the heads of the bolts. The spacing sleeves hold the bottom of the frame at a level at least as high as the top of the highest stack of materials that will be used in conjunction with the attachment 22, this being at least as high as the highest hollow die 42 that will be employed. The sleeves 54 are spaced apart transversely (widthwise of the press) a distance sufficiently great to admit the widest stack of sheets that will be employed, this being a distance at least equal to the width of the cutting area of the die block. The front-to-back dimension of the opening 46 of the frame preferably is at least equal to the front-to-back dimension on the cutting area of the cutting block and die press, so that a die, which will be carried by the attachment and will be shifted about by the attachment in a manner hereinafter to be described, can be located anywhere within the cutting area.

The die 42 is mounted on a die locating carriage 56 in a position such that the upper edge of the die is firmly abutted against the bottom surface of the carriage and the die projects downwardly in a generally vertical direction from the carriage.

Our attachment includes a means mounting the carriage for horizontal movement in a transverse direction, i.e., across the width of the attachment and the cutting block, another means mounting the carriage for horizontal movement in a direction (front-to-back) perpendicular to the width of the attachment and cutting block, another means for driving the carriage horizontally under power widthwise of the attachment, another means for selectively driving the carriage horizontally under power in a front-to-back direction, another means for periodically interrupting the transverse carriage driving power means after the die has been stepped a preselected increment sufficient to clear the previous cut by a predetermined amount of scrap, another means mounting the carriage for vertical movement, another means biasing the carriage upwardly toward the ram platen, another means for starting a ram cycle after the carriage comes to rest following a transverse stepping increment, and another means for starting a stepping cycle after the ram has come to rest after a cutting cycle.

Figure 3:
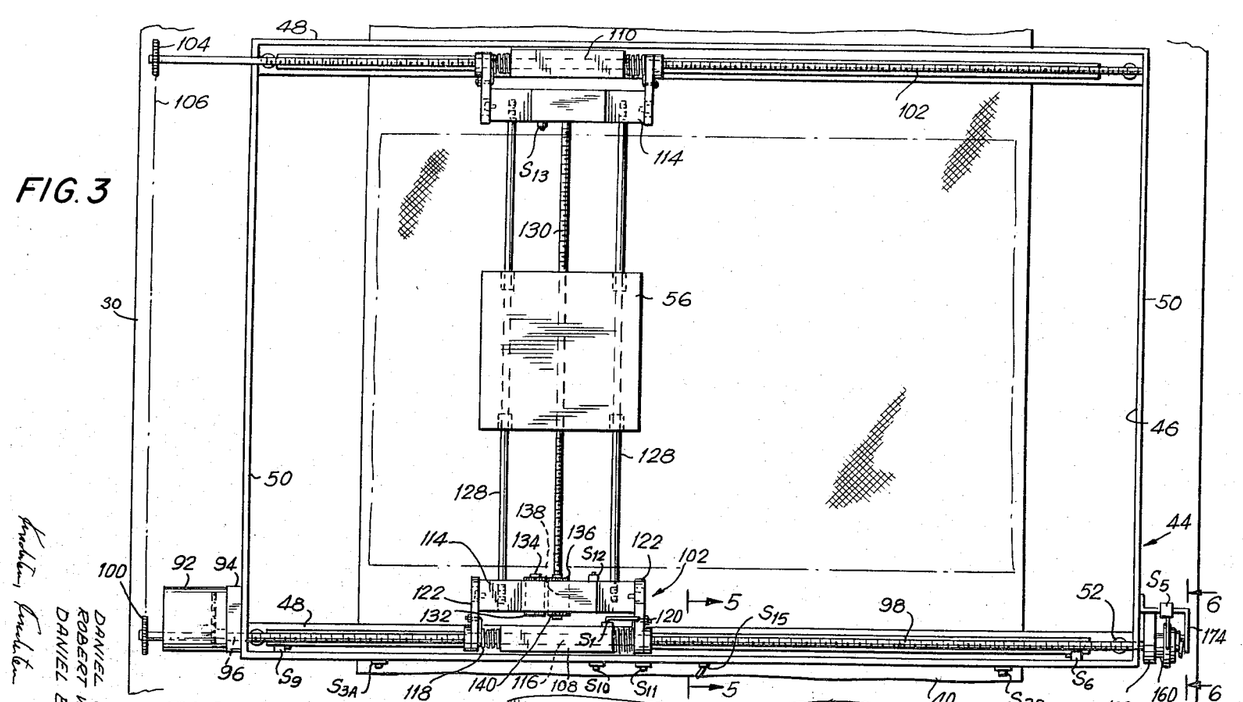
FIG. 3 is a top plan view of the attachment located in a die press and over a laid-out stack of sheets with the cutting area shown in dot and dash lines.

The carriage 56 may be of any shape that will enable a hollow die 42 to be mounted thereon. An acceptable shape is one of a square in plan, as shown, for example, in FIG. 3. The carriage is fabricated from a strong metal, e.g., steel or an aluminum alloy, and may be made hollow to save weight.

The carriage has a flat horizontal bottom wall 58 (see FIGS. 12-14) and upstanding peripheral side walls 60. The open top of the carriage is covered by a flat sheet 62 of a slippery material, for example, polytetrafluoroethylene, to enable the carriage to be moved relative to the ram platen with little effort if the attachment is so set up that it bears against the undersurface of the ram platen when the carriage is moved to shift the position of the die. The sheet 62 is held to the top of the carriage in any suitable manner, for example, adhesively or mechanically, as with clips or screws.

Three parallel ribs 64 in one piece with the base wall extend across the carriage in a front-to-back direction. Said ribs rigidify the carriage, the two outer ones being bored to receive guide rods and the center one being tapped to cooperate with a feed screw. In addition to the ribs 64 the carriage is formed with transversely extending integral rigidifying ribs 66.

The bottom wall of the carriage is formed with a large number of pairs of tapped openings 68 arranged in a suitable pattern to provide a variety of locations for strippers. The openings of each pair are at opposite sides of a different large aperture 70. Furthermore, the bottom wall carries several bolts 76 arranged in rows and columns to create a variety of patterns for attaching die holding plates in various positions. The heads of the bolts 76 are above the bottom wall, the shanks of the bolts extend through clear apertures in the bottom wall, and the lower tips of the bolts are slightly enlarged and threaded, the bolts thereby being held captive to the carriage, always ready to be used for the mounting of a die holding plate.

The bottom surface of the carriage thus provides a support for a die holding plate such, for instance, as the small die holding plate 72 shown in FIG. 9 or the large die holding plate 72' shown in FIG. 7. The die holding plates include several tapped apertures 74 (or 74') having the same modular spacing as the bolts 76, so that the plates can be located on any appropriate place on the bottom wall 58. The aperture 74 (or 74') receive the threaded tips of the bolts 76 to fix the plates in position. The plates have a group of through apertures 78 (or 78') arranged in a modular pattern which matches that of the apertures 70, so that when a plate 72 (or 72') is fastened to the carriage, the apertures 70, 78 (or 78') are in registry.

Figure 14:
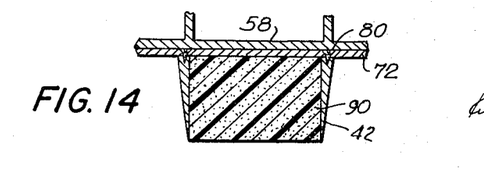
FIG. 14 is a vertical fragmentary sectional view similar to FIG. 12 of the die locating carriage showing a modified form of stripper.

Any hollow die 42 to be used is attached to a die holding plate as by screws 80 (see FIG. 14). The preferred manner of attachment is to place the die at a selected location on a holding plate and then to drill registered pairs of holes through the holding plate and blunt upper edge of the die. The holes in the upper edge of the die are tapped to receive the screws 80 whose heads are countersunk in the plate. This mode of attachment ultimately will weaken the holding plate after several dies have been mounted thereon at different times. However, the plate is expendible so as to avoid weakening of the carriage.

Figure 13:
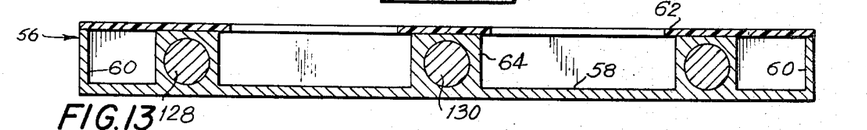

In order to eject from the hollow die a cut-out column of sheet material pieces severed from the stacked sheets, we employ a suitable stripping means, a typical one being illustrated in FIGS. 12 and 13. Said stripping means constitutes one or more downwardly facing cups 84 each dimensioned to bridge a through aperture 70 and to be held in place by screws 86 received in the tapped apertures 68. Each cup has the broad base of a tapered helical compression stripping spring 88 secured to the bottom wall of the cup, as by crimping, so that the small free end of the spring protrudes vertically downwardly through the associated aperture 70 and the aperture 78 (or 78') and into the hollow die carried by the holding plate 72 (or 72'). Enough openings 70, 78 (or 78') are provided at close enough intervals for one or more stripping springs to be mounted on the carriage in suitable locations for stripping of material from any shape of die. It will be apparent that the stripper operates by compressing the spring when the die cuts its way through a stacked sheet of material and the energy accumulated in the spring suffices to eject the column of cut pieces from the hollow die when the die is retracted from the stack.

The friction reducing sheet 62 is removed from the carriage each time that another hollow die is to be mounted so as to enable the bolts 76 and screws 86 to be manipulated, and cups 84 to be inserted or removed, or, as shown, the sheet can be formed with openings to permit manipulation of the bolts 76, and screws 80 as well as introduction or removal of cups 84.

An alternate form of stripper is shown in FIG. 14. The same constitutes a block 90 of a resilient material, such for instance, as foam rubber or a foamed synthetic elastomer within the hollow interior of the die and attached to the holding plate at the upper surface of the die, whereby to permit the block to be compressed when the die penetrates a stack of material and to eject the cut-out pieces as the die retracts.

The means mounting the carriage for horizontal movement in transverse and front-to-back directions and for power driving the carriage in said directions, as well as mounting the carriage for vertical movement and biasing it upwardly, are so mechanically interrelated that a description of the several means as a unit is simpler to follow than that of each means alone, and hence said means will be conjointly described.

Said mounting and driving unit comprises a reversible transverse traversing electrical motor 92 which is mounted on the outer surface of one of the side members 50 of the frame. The motor drives a gear reduction train 94 having an output shaft 96 which is operatively integral with a front lead screw 98 that extends transversely across the full width of the frame 44 adjacent the front angle iron member 48. The opposite ends of the lead screw are journalled in the side members 50. The right end of the lead screw drives an increment switch which will later be detailed, and the left end of the lead screw is aligned with and driven by the output shaft 96. Additionally, the output shaft 96 drives a sprocket 100 which is located on the side of the motor opposite from that adjacent to the frame 44. A duplicate rear lead screw 102 is journalled in the side members 50 adjacent the back angle bar member 48. One end of the rear lead screw 102 on the same side of the frame as the motor 92 carries a sprocket 104 which is in alignment with the sprocket 100. A chain 106 is trained about the sprockets 100, 104. Said sprockets are of the same diameter and have the same number of teeth so that the twin parallel lead screws 98, 102 turn in the same direction and at the same angular rates, the driving power being furnished by the transverse traversing motor 92 when the same is activated.

A follower 108 is mounted on the front lead screw 98 and a duplicate follower 110 is mounted on the rear lead screw 102, the followers being in front-to-back registry. The two followers are identical.

Each follower carries a ball bearing nut. Each lead screw is a ball bearing screw with a formed concave helical ball race. The nut is fitted with a tubular ball guide which interrupts the path of the balls, deflects them from the helical race, guides them diagonally across the outside of the nut, and leads them back again into the helical ball race so as to form a closed circuit through which rolling balls are a medium of engagement between the ball screw and the ball nut and recirculate continually as the screw and nut experience relative rotation. Thereby the rotary movement of the lead screws is converted to linear movement of the followers.

It will be appreciated that although this particular type of nut follower and lead screw is desirable because of its low friction loss, any similar rotary to linear conversion mechanism can be employed. Thereby, as the motor simultaneously turns the twin lead screws, the followers will be shifted in synchronism and in front-to-back registry transversely across the attachment. the direction of movement of the follower depending upon the direction of rotation of the motor 92.

The followers are guided in their transverse movement by dovetail gibs 112 on the frame riding in ways of matching configuration formed on the undersides of the followers. The gibs serve to prevent rotation of the followers when the lead screws 98, 102 are turned.

Each follower carries a different follower frame 114, the connection between the two being an oscillatable one in order to mount the frame for movement in a direction having a substantial vertical component. Specifically, each follower has an upper portion in which a horizontal shaft 116 is journalled for rockable movement about an axis parallel to the lead screws. The shaft is torsionally biased to urge the associated frame upwardly by a pair of coil springs 118, there being one spring located at each end of each follower. One end of each spring is anchored to the follower 108 and the other end is anchored at 120 to a rocker arm 122 fast on the shaft 116, there being a different rocker arm at each end of each shaft 116. The free ends of the rocker arms 122 on each follower are formed with horizontally aligned radial slots 124 (FIG. 5) which slidably receive aligned horizontal trunnions 126 extending from opposite ends of the follower frame 114. Thus, each follower frame 114 is held with its longitudinal axis horizontal adjacent the ends of the rocker arms 122 and is located in the space therebetween, said follower frame being biased upwardly by the springs 118. The rocker arms and radial slots associated with the two follower frames are identical and the rocker arms extend in a general direction toward one another and are aligned in a front-to-back direction, so that the follower frames 114 are registered in a front-to-back direction.

The follower frames are interconnected by a pair of front-to-back horizontal parallel carriage guide rods 128 which are slidable in bores in the ribs 64 of the die locating carriage. Thereby the carriage, when it is moved transversely across the attachment 2 by the front and back lead screws, is at the same time guided for movement in a front-to-back direction by the rods 128.

A front-to-back traversing lead screw 130 parallel to and at the same horizontal level as the guide rods 128 has its opposite ends journalled in the front and back follower frames 114. Said front-to-back lead screw meshes with a matching thread formed in the bore of the central rib 64 of the carriage, so that when this lead screw is turned it will move the carriage either forwardly or rearwardly depending upon its direction of rotation.

Figure 4:
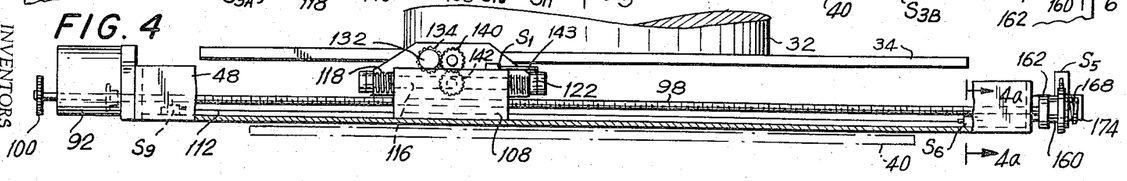
FIG. 4 is a front elevational view of the attachment situated in a die press, the press ram being shown elevated and the cutting area being shown in dot and dash lines.

For the purpose of turning said lead screw 130 we provide a front-to-back traversing electric motor 132 (FIGS. 3, 5 and 15) having a pinion 134 on its output shaft. Said pinion meshes with an input pinion 136 of a gear reduction train 138 having an output pinion 140 that meshes with a pinion 142 (FIG. 4) fixed to the front end of the lead screw 130.

It will be apparent that operation of the motor 92 traverses the carriage 56 transversely of the attachment, and that operation of the motor 132 traverses the carriage in a front-to-back direction. It also will be apparent that the carriage is urged upwardly by the front and back pairs of springs 118, but that the carriage can be forced vertically downwardly against the action of these springs by descent of the ram platen 34.

The rocker arms 122, radial slots 124, follower frames 114 and followers 108, 110 are so positioned on the attachment that the carriage 56 and its supporting, guiding and driving means are of comparatively slight overall height and can be fitted into existing die presses with the carriage located between the ram platen and a stack of sheet material on the cutting black. In the uppermost position of the ram platen the upper surface of the carriage will either bear lightly against the undersurface of the platen under the pressure of the springs 118, or will be in an uppermost position spaced a short distance below said platen, the upper limit of travel being suitably defined as by abutment of the trunnions 126 against the inner ends of the radial slots 124. The slots 124 are long enough to allow the ram platen to drive the carriage down a distance sufficient for the cutting edge of the hollow die to touch the cutting block. The uppermost position of the carriage also may be determined by any alternate form of abutment means or by the springs 118. Said springs are stiff and can halt upward movement of the carriage upon reaching their unstressed condition.

Figure 2:
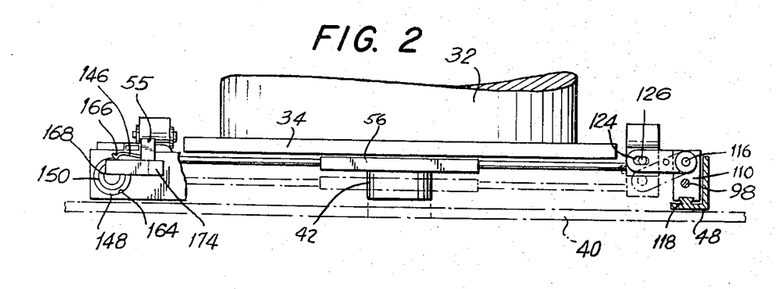
FIG. 2 is a side view of said press with the piston lifted, with the die locator carriage shown in full lines in its uppermost position and in dot and dash lines in its lowermost position and with a stack of sheets shown fragmentarily in dot and dash lines below the attachment.

In FIG. 2 the upper position of the die locating carriage and its supporting and guiding structure is shown in full lines and its lower position in dot-and-dash lines.

Several switches are included to actuate and control the operation of the different power driving means for the die locating carriage and the ram. These switches include a platen switch $S_1$ (FIGS. 3, 5 and 15) which is responsive to the location of the platen at or departure of the platen from its upper position. Said switch $S_1$ can, if desired, be mounted on the die press and include a feeler element which is responsive to the position of the platen at or the departure of the platen from its uppermost position. However, it is convenient to have the switch $S_1$ mounted on the attachment 22 so that it can be installed at the factory. For example, said switch $S_1$ which is a normally closed single-pole, single-throw momentary switch, is secured to the front frame 108 and has an actuating feeler 143 (FIG. 5) disposed above one of the rocker arms 122 and so located that when said rocker arm is in its uppermost position or a position corresponding to an uppermost position of the press platen, the feeler will hold open the contacts of said switch. When the platen starts to move downward and the rocker arm experiences a corresponding movement, the contacts of the switch $S_1$ will close.

Figure 15:
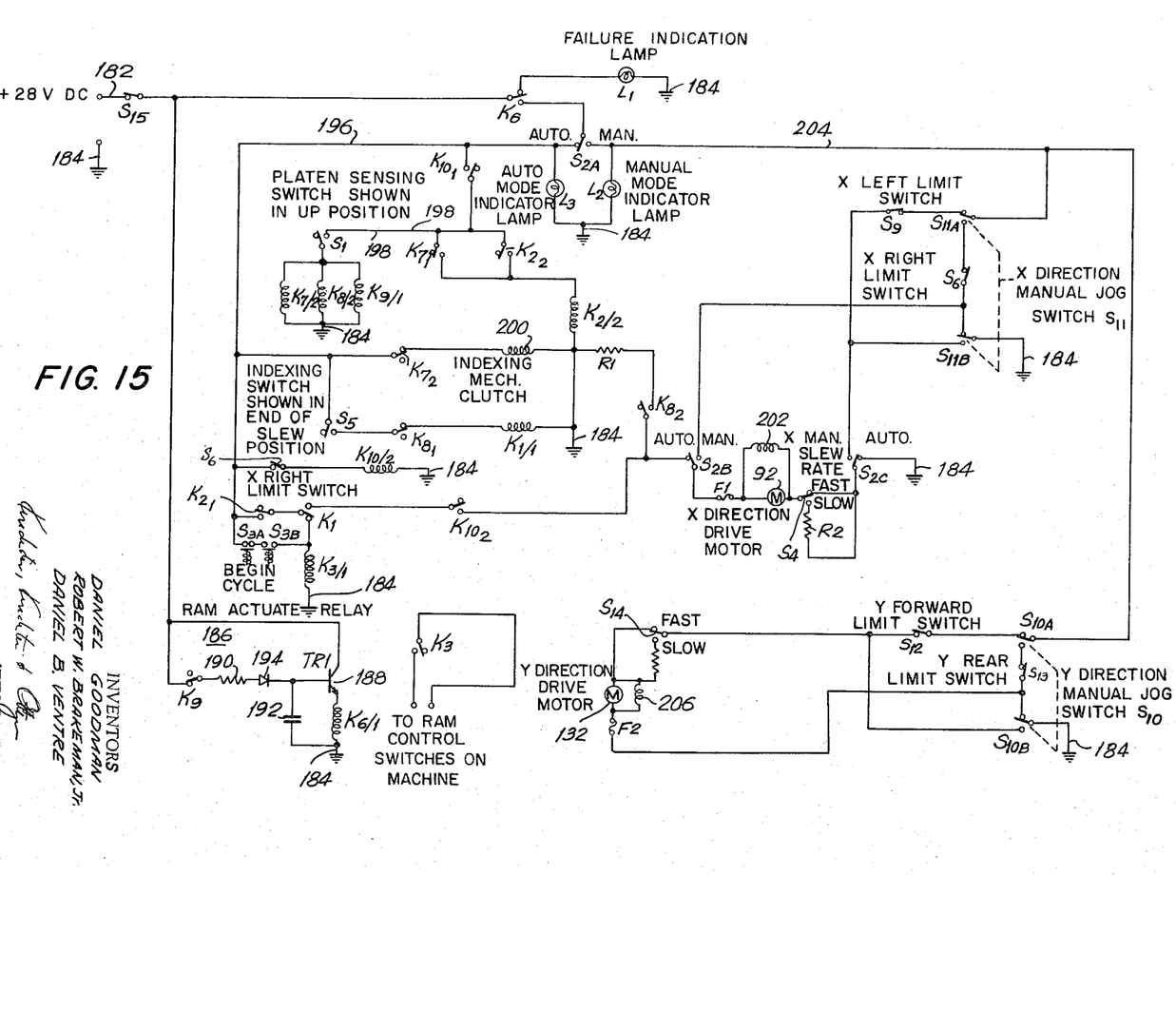
FIG. 15 is a schematic diagram of the electrical control circuit for the attachment.

The next switch $S_2$ (FIG. 15) is an auto-manual multiple-pole double-throw switch that will remain in either position to which it is thrown. The physical location of the switch has not been illustrated since it is of no particular importance. If desired, it may be contained within the switch box 38. The electrical connections for the switch are shown in FIG. 15.

The next switch $S_3$ (FIGS. 1, 3 and 15) actually constitutes a pair of switches $S_{3A}$ and $S_{3B}$ of the single-pole single-throw normally open momentary type. These switches are mounted at any convenient place on the attachment 22 where they are sufficiently widely spaced apart to require the use of both hands of the operator to actuate the same. In other words, to actuate both of these switches simultaneously requires the use of both of the operator's hands, so that at this time his hands cannot be beneath the ram or the cutting die. Such arrangement is for safety purposes. It is within the scope of our invention to locate these switches on the frame of the die press, but, as in the case of the platen switch $S_1$, we prefer to have these switches mounted on the attachment, e.g. on the front member 48, so as to simplify installation of the attachment.

The next switch is a fast-slow switch $S_4$ (FIG. 15) for the reversible transverse traversing motor 92. It is a single-pole double-throw switch that will remain in either position into which it is thrown. The physical position of this switch is of no importance and it may be placed in the switch box 38.

The next switch is an increment switch $S_5$ (FIGS. 3, 4, 6 and 15 which determines the extent of movement of each transverse step of the carriage, that is to say, which measures transverse movement of the carriage and determines when the carriage has moved far enough to complete one widthwise step. This switch is a normally open single-pole single-throw momentary switch. Said switch includes a stationary contact 144 (FIG. 6) and a movable contact 146, the movable contact being biased away from the stationary contact. The movable contact rides on an electrically non-conductive disc 148. Said disc is flat against and concentric with a driving disc 150. The two discs are interconnected for common movement by an adjusting screw 152, the head of which presses against the driving disc 150 and the shank of which extends through a long concentric slot 154 in said disc. The tip of the screw engages a tapped well in the disc 148. When the screw is tightened, the relative angular location of the two discs is fixed. However, this location may be changed by loosening the screw, altering the angular position of the disc 148 and retightening the screw. Both discs are mounted on a shaft 156, the actual connection being effected by a set screw 158 extending through a hub fast to the disc 150 and engaging the shaft 156 so that the disc 150 is in a fixed position on the shaft but the disc 148 can be rotated relative to the shaft to adjust its angular position.

The shaft 156 is the output shaft of an electrically controlled magnetic clutch 160 (FIG. 4) the input of which is connected to a gear reduction train 162 driven by an end (as shown, the right-hand end) of the transverse traversing front lead screw 98. It will be appreciated that when the clutch is engaged (operative to transmit motion) and the carriage is traversed from left to right, the output shaft 156 will be turned slowly by the gear reduction train. The step-down ratio of the gear reduction train is sufficiently great for the shaft 156 to turn through approximately 180° for the largest increment of movement that will be experienced by a hollow die to be shifted by the attachment 22. Smaller movement of the die and carriage will cause lesser angular movements of the shaft 156.

The disc 148 is provided with a switch operating notch 164 which, when it comes into registration with an operating nib 166 on the contact 146, will permit the switch contact 146 to spring away from the switch contact 144.

Means is included to rotatably bias the discs 148, 150 to an idle or starting (zero) position. Such means constitutes a single turn torsion spring 168 having one end engaging a pin 170 fast to the disc 150 and the other end engaging a pin 172 fast to a bracket 174 which mounts the increment switch $S_5$ and the gear reduction train 162. When the actuating coil for the magnetic clutch is de-energized the clutch will become disengaged and the spring 168 will rotate the two discs in a clockwise direction (as viewed in FIG. 6) until the pins 170, 172 abut one another. The corresponding angular location of the discs represents the idle position of the control means for the increment switch $S_5$. When the magnetic clutch is engaged, turning of the lead screw 98 will slowly rotate the discs in the direction of the arrow A until the notch 164 registers with the nib 166 at which time the contacts of said switch $S_5$ will open.

Figure 4A:
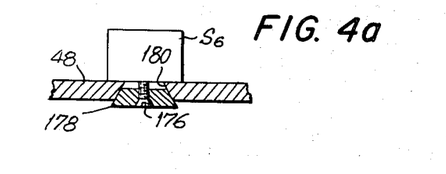
FIG. 4A is an enlarged sectional view taken substantially along the line 4A—4A of FIG. 4.

The next switch is the switch $S_6$ (FIGS. 3, 4, 4a and 15) which is a double-pole, single-throw normally closed momentary switch that is the right-hand transverse carriage limit switch. Said switch is physically secured to the front angle bar frame 48 in a position which is in the path of travel of the frame 108. The actuating element of said switch $S_6$ is contacted by the frame to define the extreme right-hand movement of the carriage and the hollow die. The position of the switch $S_6$ is adjustable and, to this end, as shown in FIG. 4a, the switch is provided with a mounting screw 176 that, when tightened, wedges a plate 178 into a slot 180 in the horizontal flange of the front angle iron member 48. To set the position of the switch $S_6$, the screw is loosened, the switch slid to its desired location and the screw retightened.

The next switch is a switch $S_9$ (FIGS. 3, 4 and 15) which is similar to the switch $S_6$ in that it is a limit switch for the transverse movement of the carriage. However, the switch $S_9$ is at the left-hand side of the frame 44 in a position which otherwise is similar to that of the switch $S_6$. The switch $S_9$ is a single-pole, single-throw normally closed momentary switch.

The next switch is the switch $S_0$ (FIGS. 3 and 15) which is a forward-and-back manual jog switch in the front-to-back traversing direction. The switch $S_{10}$ is a double-pole, double-throw switch that will remain in either position into which it is thrown. Said switch is located on the vertical flange of the front angle bar member 48.

The next switch is a switch $S_{11}$ (FIGS. 3 and 15) which likewise is a manual jog switch, but is for a transverse traversing direction. This switch too is a double-pole, double-throw switch that will remain in either position into which it is thrown and is physically located next to the switch $S_{10}$.

The next switch $S_{12}$ (FIGS. 3 and 15) is a single-pole, single-throw normally closed momentary switch which determines the forward limit of travel of the carriage 56. Said switch and its feeler are located on the inner face of the front follower frame 114 in the path of travel of the carriage 56.

There is a corresponding rear limit switch $S_{13}$ (FIGS. 3 and 15) located, together with its feeler on the inner face of the rear follower frame 114 in the path of travel of the carriage 56. The switch $S_{13}$ is a normally closed single-pole, single-throw momentary switch.

The next switch is a fast-slow switch $S_{14}$ for the front-to-back reversible traversing motor 132. It is a single-pole double-throw switch that will remain in either position into which it is thrown. The physical location of this switch is of no importance and it may be placed in the switch box 38.

The last switch is the power switch $S_{15}$ which is a single-pole, single-throw switch that will remain in either position to which it is thrown. The switch $S_{15}$ should be physically placed in a convenient location, as for example, on the vertical flange of the front angle bar 48. However, it may be located in the switch box 38.

The electrical control circuit for the attachment 22 is shown in FIG. 15. It includes all of the switches described above, several relays, together with the contacts controlled thereby, as well as other affiliated components all of which and the connections therefor now will be described.

The circuit is designed to be used in conjunction with a D.C. source of supply, such, for example, as a 28 volt D.C. line constituting a 28 volt positive bus 182 and a ground 184. For convenience, the circuit has been shown in the form of a single wire diagram with several common grounds.

The power from the positive bus is connected through the power switch $S_{15}$, when closed, to an amplifying circuit 186 and then to ground. The amplifying circuit consists of a NPN transistor 188 whose collector is directly connected to the positive bus and whose base is connected to the positive bus through a resistor 190. The emitter of the transistor is connected to one end of the actuating coil of a relay $K_{6/1}$ whose other terminal is connected to ground (the first number of the subscript for all relays identifies the relay, the second number, i.e., the number which follows the slash line, denotes the number of contacts controlled by the relay). The configuration of the amplifier is such that when a positive potential is applied to its collector and a lesser positive potential is applied to its base, current will flow from the collector to the emitter and thence through the relay coil $K_{6/1}$ to ground.

A capacitor 192 is shunted across the actuating coil of the relay $K_{6/1}$. The circuit connecting the positive terminal of the D.C. power to the base electrode includes, in addition to the resistor 190, and in series therewith, a rectifier 194 to control the direction of current flow in the collector-to-base circuit, and the normally closed contacts $K_9$ of a relay $K_{9/1}$.

When the switch $S_{15}$ is initially closed and the attachment is idle and the ram is at the uppermost part of its stroke, the actuating coil of the relay $K_{9/1}$ is de-energized so that the contacts $K_9$ are closed. Hence, as soon as the switch $S_{15}$ is closed the relay $K_{6/1}$ is energized and at the same time a charge is built up on the capacitor 192. This charge will be maintained so long as the contacts $K_9$ remain closed and for a predetermined time after the contacts $K_9$ are opened.

Energization of the actuating coil of the relay $K_{6/1}$ shifts the blade of the contacts $K_6$ of said relay $K_{6/1}$ from a normally idle position in which the positive bus 182 is connected to a lamp $L_1$ and then to ground, to a second position in which the bus 182 is connected to the movable contact of one of the blades of the contacts $S_{2A}$ of the auto-manual switch $S_2$. Since the switch $S_2$ is in automatic position positive voltage is led to a subbus 196.

The subbus 196 is connected through the series connected start cycle switches $S_{3A}$ and $S_{3B}$ to one end of the actuating coil for relay $K_{3/1}$ the other end of which is connected to ground. Thereby, upon closing of the power switch $S_{15}$, providing that the relay $K_{9/1}$ is idle and that the switch $S_2$ is in automatic position, the relay $K_{3/1}$ is energized to close its normally open contacts $K_3$. These contacts $K_3$ are series connected, as indicated in FIG. 15, to ram control switches which are conventionally provided on the die press. Closure of the contacts $K_3$ initiates a single cycle control which will bring the ram platen down from its upper position and then reverse it to drive the ram platen back up to its idle position where it comes to rest.

Power from the subbus 196 also is applied through the normally closed contacts of the right limit switch $S_6$ to the actuating coil of a relay $K_{10/2}$ and then to ground so that the relay $K_{10/2}$ is actuated at all times that the carriage does not engage the right limit switch $S_6$. Power flows from the subbus 196 through the relay contacts $K_{10_1}$ to an auxiliary bus 198 whereby the auxiliary bus is powered when the main switch $S_{15}$ is closed and the carriage is away from its extreme right-hand position.

As soon as the ram platen leaves its uppermost position the platen switch $S_1$ closes to energize the actuating coils of the three relays $K_{7/2}$, $K_{8/2}$, and $K_{9/1}$. Energization of the relay $K_{7/2}$ closes the relay contacts $K_{7_1}$ which completes an energizing circuit from the auxiliary bus 198 through the contacts $K_{7_1}$ to the actuating coil of a relay $K_{2/2}$ and then to ground.

It will be recalled that the cycle of the ram platen is started by supplying power to the relay $K_{3/1}$ through the switches $S_{3A}$ and $S_{3B}$. However, these switches are only momentarily closed by the operator who releases them when the ram begins its cycle. It is necessary to apply power to the ram cycling relay $K_{3/1}$ again after each stepping incremental movement of the die is completed. This is performed by actuation of the relay $K_{2/2}$ after it is energized by actuation of the relay $K_{7/2}$ when the platen leaves its uppermost position. The contact $K_{2_1}$ directs power from the subbus 196 and a normally closed pair of contacts $K_1$ to the ungrounded end of the actuating coil of the relay $K_{3/1}$. Thereby, so long as the relay $K_{2/2}$ remains energized and the relay $K_{1/1}$ is idle, power will be supplied to the ram cycling control relay $K_{3/1}$.

The relay $K_{2/2}$, after its initial energization upon closing of the contacts $K_7$, is maintained energized by closure of the contacts $K_{2_2}$ which shunt the contacts $K_{7_1}$. Thereby, the relay $K_{2/2}$ when once energized will remain energized until de-energization of the relay $K_{10/2}$ which takes place when the carriage reaches its right-hand limit of travel and opens the switch $S_6$ in the energizing circuit for the relay $K_{10/2}$.

Energization of the actuating coil of the relay $K_{8/2}$, which takes place when the ram leaves its uppermost position, opens the normally closed contact $K_{8_1}$ in the energizing circuit for the actuating coil of the relay $K_{1/1}$. This energizing circuit for said relay $K_{1/1}$ also includes the switch $S_5$ which is closed, except at the end of a slewing (traversing) movement of the carriage. Phrased differently, the switch $S_5$ remains closed as the carriage is moved transversely an incremental step by rotation of the lead screws 98, 102, said switch $S_5$ opening when the carriage is moved (slewed) through the preselected transverse distance. Hence, each time that the carriage has stepped the predetermined distance, the normally closed contacts $K_1$ in the hold energizing circuit (shunting the branch of the circuit containing the series switches $S_{3A}$ and $S_{3B}$) of the relay $K_{3/1}$ opens to de-energize the relay $K_{3/1}$ and to permit the contacts $K_3$ to open so as to reset the single cycle control of the die press which will not start a fresh or second cycle until the contacts $K_3$ reclose.

Also, as the ram leaves its upper rest position and permits switch $S_1$ to close, energization of the relay $K_{7/2}$ opens the normally closed contacts $K_{7_2}$ in the energizing circuit for the actuating coil 200 of the indexing magnetic clutch 160. This disengages the clutch and permits the spring 168 to restore the disc 148 to its idle or zero, i.e., start, position at which time the switch $S_5$ is closed. Thus, the switch $S_5$ which is opened at the end of a slewing movement of some predetermined distance is reclosed at the start of each ram moving cycle.

Furthermore, as the ram leaves its upper rest position and permits switch $S_1$ to close, energization of the relay $K_{8/2}$ closes the normally open contacts $K_{8_2}$. This action grounds the power side of the transverse traversing motor 92 through the resistor $R_1$ and switch contact $S_{2B}$ which at this time is in automatic position, thus providing a safety circuit to prevent the motor 92 from running during a cutting cycle of the ram.

Energization of the relay $K_{9/1}$, which takes place as soon as the ram starts its downward movement, opens the normally closed contact $K_9$ in the base-to-collector circuit of the transistor 188. However, the transistor remains conducting because of the charge on the capacitor 192. Said capacitor 192 is so sized that it will maintain an operational charge on the base of the transistor for a period of time sufficiently long to permit the ram platen to complete one full cutting stroke and return to rest position, e.g., about ten seconds. At the end of this period to which a few seconds are added as a safety factor, the capacitor will have discharged through the actuating coil of the relay $K_{6/1}$ to such an extent as to render the collector-to-emitter circuit of the transistor sufficiently non-conductive to de-energize the relay $K_{6/1}$. As soon as this occurs, the contact $K_6$ moves to a position disconnecting the positive bus 182 from the subbus 196. Such action will idle the ram and carriage operating circuit for the attachment 22 and concurrently will energize a failure indicator lamp $L_1$.

When the ram platen completes its upward stroke and comes to rest, the platen switch $S_1$ will open, thus indicating to the circuit that the cutting die is clear of the stack of sheet material and that the transverse stepping movement of the carirage and die can be commenced. Opening of the switch $S_1$ de-energizes the relay $K_{8/2}$ allowing contact $K_{8_1}$ to reclose and causing the normally open contacts of $K_1$ to close so as to complete a circuit from subbus 196 through the now closed contacts $K_{2_1}$ and the now closed side of the double-throw contact $K_1$ to the contacts $K_{10_2}$. The contacts $K_{10_2}$ are closed at this time inasmuch as the switch $S_6$ is closed and the relay $K_{10/2}$ is energized. Thereby, power is supplied from the subbus 196, through the closed contacts $K_{2_1}$, the closed side of the double-throw contact $K_1$, the closed contact $K_{10_2}$ and the switch $S_{2B}$ to the power side of the motor 92. It will be noted that the contacts $K_{8_2}$ are now open because the ram is in its uppermost position and the relay $K_{8_2}$ is de-energized.

The other side of the motor is connected to ground 184 through the fast-slow switch $S_4$ and the switch $S_{2C}$ which is in automatic position. It will be observed that if the automatic stepping transverse traversing is to be performed slowly, the fast-slow switch $S_4$ is thrown to its slow position in which the resistor $R_2$ is insered in the ground side of the energizing circuit for the motor 92.

A brake (not shown) holds the motor 92 stationary when the same is de-energized, said brake being spring biased into operative braking position. The brake is shifted to inoperative position upon energization of the motor by actuation of a solenoid 202 connected in parallel with said motor 92.

As long as the ram is in its uppermost position and the limit switch $S_6$ and the increment switch $S_5$ are closed, the motor 92 will continue to run. Its movement will be halted when the increment switch $S_5$ is opened at the end of a preselected transverse travel of the carriage and hollow die.

As soon as the switch $S_5$ opens, the relay $K_{1/1}$ de-energizes to move the double-throw contact $K_1$ from a position completing the energizing circuit for the motor 92 to a position completing the energizing circuit for the relay $K_{3/1}$, it being recalled that the contacts $K_{2_1}$ remain closed as long as the relay $K_{10/2}$ remains energized which is for the complete transverse traversing span of the carriage. Closure of the contact $K_1$ for the energizing of relay $K_{3/1}$ starts a fresh ram cycle.

Thereafter the ram cycle and the incremental (stepping) transverse traversing cycle of the carriage alternate until the carriage engages the switch $S_6$ to de-energize the relay $K_{10/2}$ which opens the contacts $K_{10_1}$ and idles the portion of the circuit which controls the automatic operation of the ram platen and the carriage. The carriage and ram then will remain stationary, awaiting manual control thereof by the operator.

It will be noted that when the auto-manual switch $S_2$ is in its automatic position, a circuit is completed from the bus 182 through the closed contacts $K_6$ and the switch $S_{2A}$ to the lamp $L_3$ indicating that the circuit is in its automatic mode. When the switch $S_{2A}$ is in its manual mode the lamp $L_2$ will be energized.

Summarizing as to the automatic stepping transverse traversing movement of the carriage and die, alternated with vertical movement of the ram platen, and assuming that the carriage is at the left-hand side of the machine in home position against the switch $S_9$ that the ram is in its uppermost position, closing the power switch $S_{15}$ and closing the switches $S_{3A}$ and $S_{3B}$ starts the ram cycle. When the ram descends it prepares the ram operating relay $K_{3/1}$ for subsequent single cycle operations at the end of each incremental movement of the carriage. It also restores the increment switch $S_5$ to its idle (zero) position, i.e., recycles the indexing switch. Furthermore, it starts the time delay cycle of capacitor 192 which measures the operational time of a ram cycle, it cuts out the motor 92, but it prepares the energizing circuit for said motor.

When the ram completes its cycle opening of the switch $S_1$ and consequent closure of the energizing circuit for the motor 92 starts the transverse incremental movement of the carriage. As soon as the transverse incremental movement of the carriage is terminated by opening of the switch $S_5$, the motor 92 is stopped and the ram is again recycled.

These operations take place alternately until the carriage reaches the right-hand limit of its travel to open the switch $S_6$ whereupon the automatic cycling of the ram and carriage are halted.

Restoration of the carriage to its left-hand home position and movement of the carriage in a front-to-back direction may be performed automatically. However, the circuit illustrated is arranged for these operations to be controlled by hand, i.e., by the operator.

Hence, when the automatic operations of the ram and carriage stop, the operator throws the switch $S_2$ to its manual position. Throwing the switch $S_{2A}$ to manual position places a positive potential on the manual bus 204, the contacts $K_6$ being in attachment-operating position, since the ram platen is in its uppermost and the relay $K_{6/1}$ is energized. Positive potential is transferred from the manual bus 204 to the right moving side of the motor 92 through double-throw switch contacts $S_{11A}$ of the transverse direction manual jog switch $S_{11}$, and the right limit switch $S_6$ and the switch $S_{2B}$. The motor at this time is grounded through the switch $S_{2C}$ and the transverse direction manual jog switch $S_{11B}$, said switches $S_{11A}$ and $S_{11B}$ being physically connected for joint movement. Reversing the direction of throw of the switch $S_{11}$ brings power from the manual bus 204 to the left moving side of the motor 92 through the switch $S_{11A}$, the switch $S_9$ and the switch $S_{2C}$, which is in manual position, and the switch $S_{11B}$. It will be apparent that the extent of movement of the carriage either to the right or to the left under manual control is limited by the switches $S_9$ and $S_6$.

A similar circuit arrangement is provided for moving the carriage in a front-to-back or back-to-front direction by energizing the motor 132 in a proper sense.

The carriage is moved in a back-to-front direction by energizing the motor circuit from the manual bus 204 through the manual jog switch $S_{10A}$, the forward limit switch $S_{12}$ and the fast slow switch $S_{14}$, said motor at this time being connected to ground through the switch $S_{10B}$. The direction of rotation of the motor 132 is reversed by reversing the position of the switch $S_{10}$ which thereupon will place positive potential on the opposite side of the motor through the switches $S_{10A}$ and $S_{13}$ and will ground the other side of the motor through the switch $S_{10B}$. The fast-slow switch $S_{14}$ for the motor 132 controls the speed of said motor. The motor 132 likewise is provided with a brake which is spring biased to operating position and is released (rendered ineffectual) upon energization of a solenoid 206 which is connected across the motor so as to be actuated when the motor is supplied with power.

To simplify the legends on the wiring diagram of FIG. 15, the transversing direction of movement of the carriage is referred to as the X direction, and the front-to-back direction of movement of the carriage is referred to as the Y direction.

It should be pointed out that the carriage is incrementally stepped in the X direction from left to right when the carriage is in its uppermost stack-clearing position and is maintained horizontal by the guide rods 128 and the like positions of the rocker arms 122 and the follower frames 114. This horizontal position is maintained when the platen descends due to the flat engagement between the top of the carriage and the bottom of the platen, inasmuch as the platen maintains a fixed horizontal orientation as it moves vertically. Moreover, the carriage will not shift in an X or Y direction when the platen descends due to the fact that the die immediately enters the stack of sheet material as soon as the carriage starts to descend, the attachment being so set that the sharp lower edge of the die barely clears the top sheet of the stack when the carriage is in its uppermost position.

It thus will be seen that we have provided a device which achieves the several objects of our invention and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:

1. An attachment for converting a die press with a hand shiftable hollow die to a die press with an automatically shifting hollow die, which die press includes a stationary portion constituting a cutting block and a movable portion constituting a vertically shiftable horizontal platen and which die press further includes a single cycle control that when actuated will drive the platen down toward the cutting block and will then raise the platen back to an uppermost position of rest, said attachment comprising a hollow frame, means to mount said frame on the stationary portion of the die press with the hollow frame above and circumscribing a cutting area of the cutting block, a die locating carriage arranged to have a hollow die secured to its undersurface, means mounting the carriage for movement in a horizontal transverse direction relative to the frame, power means for shifting the carriage in said horizontal transverse direction, means mounting the carriage for vertical movement, means biasing the carriage vertically upwardly toward the platen, settable indexing means for deactivating the power means after the carriage has shifted a preselected increment, means operable after deactivation of the power means to actuate the single cycle control for the platen, and means operable after completion of the single cycle of the platen to reactivate the power means, said power means and said single cycle control for the platen being operable alternately to step the die transversely across the frame with the platen being actuated when the carriage is stationary and with the carriage being actuated when the platen is in its uppermost position of rest.

2. An attachment as set forth in claim 1 wherein the upper surface of the carriage bears against the platen when the platen is in its uppermost position of rest.

3. An attachment as set forth in claim 2 wherein the upper surface of the carriage has a low coefficient of friction.

4. An attachment as set forth in claim 1 wherein the power means for shifting the carriage in said horizontal transverse direction constitutes an electric motor, a lead screw driven by the motor and a follower nut movable with the carriage.

5. An attachment as set forth in claim 1 which further includes means for limiting upward movement of the carriage.

6. An attachment as set forth in claim 1 in which the carriage has a home position adjacent one side of the frame and in which means is provided adjacent the opposite side of the frame for limiting said transverse power movement of the carriage.

7. An attachment as set forth in claim 6 which further includes power means for reversely shifting the carriage in a direction opposite to said horizontal transverse direction back to the home position.

8. An attachment as set forth in claim 7 wherein manually operable means is provided to control the reverse shifting means.

9. An attachment as set forth in claim 1 wherein the settable indexing means includes a clutch, said clutch being driven by said power means when the carriage is being shifted in said horizontal transverse direction, and wherein means further is included to disengage the clutch after the power means is deactivated.

10. An attachment as set forth in claim 1 which further includes means to prevent activation of the power means while the platen is cycling.

11. An attachment as set forth in claim 1 which further includes means to deactivate the power means when the platen is not restored to its uppermost at rest position within a predetermined period of time.

12. An attachment as set forth in claim 1 which further includes a die holding plate adapted to have a hollow die connected thereto and means for attaching the die holding plate to the undersurface of the carriage.

13. An attachment as set forth in claim 1 which further includes means for securing strippers to the carriage at modularly arranged locations thereon for cooperation with hollow dies located at sundry sites on the carriage.

14. An attachment as set forth in claim 1 which further includes manually controllable means for actuating the power means to shift the carriage in said horizontal transverse direction in opposite senses.

15. An attachment as set forth in claim 1 which further includes means for controlling the speed at which the power means shifts the carriage in said horizontal transverse direction.

16. An attachment as set forth in claim 1 which further includes brake means for quickly stopping movement of the carriage in said horizontal transverse direction when the power means is deactivated.

17. An attachment for converting a die press with a hand shiftable hollow die to a die press with an automatically shifting hollow die, which die press includes a stationary portion constituting a cutting block and a movable portion constituting a vertically shiftable horizontal platen and which die press further includes a single cycle control that when actuated will drive the platen down toward the cutting block and will then raise the platen back to an uppermost position of rest, said attachment comprising a hollow frame, means to mount said frame on the stationary portion of the die press with the hollow frame above and circumscribing a cutting area of the cutting block, a die locating carriage arranged to have a hollow die secured to its undersurface, means mounting the carriage for movement in a horizontal transverse direction relative to the frame, means mounting the carriage for movement in a horizontal front-to-back direction relative to the frame, first power means for shifting the carriage in said horizontal transverse direction, second power means for shifting said carriage in said horizontal front-to-back direction, means mounting the carriage for vertical movement, means biasing the carriage vertically upwardly toward the platen, settable indexing means for deactivating the first power means after the carriage has shifted a preselected increment, means operable after deactivation of the first power means to actuate the single cycle control for the platen, and means operable after completion of the single cycle of the platen to reactivate the first power means, said first power means and said single cycle control for the platen being operable alternately to step the die transversely across the frame with the platen being actuated when the carriage is stationary and with the carriage being actuated when the platen is in its uppermost position of rest.

18. An attachment as set forth in claim 17 wherein the means mounting the carriage for movement in a horizontal transverse direction relative to the frame constitutes a pair of parallel spaced elongated horizontal members extending transversely across the frame, and wherein the means mounting the carriage for movement in a horizontal front-to-back direction relative to the frame constitutes a second pair of parallel spaced elongated horizontal members perpendicular to the first pair of horizontal members, and means mounting the second pair of members for movement perpendicularly of their length along the first pair of members.

19. An attachment as set forth in claim 18 which further includes means mounting the carriage for movement along the second pair of members.

20. An attachment as set forth in claim 19 wherein the means mounting the second pair of members on the first pair of members is constructed and arranged to permit bodily conjoint vertical movement of the second pair of members with respect to the first pair of members.

21. An attachment as set forth in claim 20 wherein the means mounting the second pair of members for vertical movement with respect to the first pair of members constitutes registered elements movable along the first pair of members, said registered elements having arms rockable about horizontal axes to support the second pair of members.

22. An attachment as set forth in claim 17 which further includes means for limiting front-to-back movement of the carriage by the second power means.

23. An attachment as set forth in claim 17 which further includes manually controllable means for actuating the second power means in opposite senses.

References Cited

UNITED STATES PATENTS

| | | | |
|---|---|---|---|
| 1,471,858 | 10/1923 | Nelson | 83—558 |
| 1,493,010 | 5/1924 | Winkley | 83—25 |
| 2,021,461 | 11/1935 | Moon | 83—69 |
| 3,269,241 | 8/1966 | Schott et al. | 83—562 X |
| 3,264,915 | 8/1966 | Peterson et al. | 83—71 |

ANDREW R. JUHASZ, *Primary Examiner.*